(12) United States Patent
Austin

(10) Patent No.: US 8,992,009 B2
(45) Date of Patent: Mar. 31, 2015

(54) MODULE EYE GLASSES

(76) Inventor: Francis William Austin, Albany (NZ)

(*) Notice: Subject to any disclaimer, the term of this patent is extended or adjusted under 35 U.S.C. 154(b) by 70 days.

(21) Appl. No.: 13/699,826

(22) PCT Filed: May 24, 2011

(86) PCT No.: PCT/NZ2011/000085
§ 371 (c)(1), (2), (4) Date: Nov. 26, 2012

(87) PCT Pub. No.: WO2011/149364
PCT Pub. Date: Dec. 1, 2011

(65) Prior Publication Data
US 2013/0169922 A1    Jul. 4, 2013

(30) Foreign Application Priority Data
May 26, 2010    (NZ) .......... 585644

(51) Int. Cl.
G02C 5/14    (2006.01)
G02C 5/22    (2006.01)
G02C 1/08    (2006.01)

(52) U.S. Cl.
CPC .. *G02C 5/22* (2013.01); *G02C 1/08* (2013.01); *G02C 5/2209* (2013.01); *G02C 2200/08* (2013.01)
USPC .......... 351/116; 351/111

(58) Field of Classification Search
CPC .. G02C 5/2209; G02C 5/146; G02C 2200/08; G02C 1/08; G02C 5/10; G02C 5/14; G02C 5/22
USPC .......... 351/41, 90–95, 96–99, 100–102, 111, 351/116, 121, 140, 149, 153, 154
See application file for complete search history.

(56) References Cited

U.S. PATENT DOCUMENTS

| 2,473,619 A | 6/1949 | Talobre |
| 2,594,395 A | 4/1952 | Castelli |

(Continued)

FOREIGN PATENT DOCUMENTS

| AU | WO 9411774 | * 5/1994 |
| AU | 2008207517 | 2/2010 |

(Continued)

OTHER PUBLICATIONS http://www.perret-optic.ch/lunetterie/lunette-coloration-change-able/lun-color_changeable!gb.htm.

(Continued)

*Primary Examiner* — Thomas K Pham
*Assistant Examiner* — Sharrief Broome
(74) *Attorney, Agent, or Firm* — Nixon & Vanderhye P.C.

(57) ABSTRACT

An eyeglass assembly formed of detachable and interchangeable parts. The assembly comprises detachable upper and lower frame parts that define an aperture for receiving lenses or a lens assembly. Two interchangeable temple arms are pivotally connected to the upper and lower frame parts and assist in holding the eyeglass assembly together. The eyeglasses advantageously allow a wearer, manufacturer, designer, distributor and/or retailer to vary the shape, style, size or color of the eyeglasses to suit their requirements by a simple interchange of parts. Other embodiments are directed to eyeglass components formed from heat dissipating material, specifically temple arms comprising an insert formed of a heat dissipating material such as a polymer or aluminum.

20 Claims, 19 Drawing Sheets

(56) References Cited

U.S. PATENT DOCUMENTS

| | | | |
|---|---|---|---|
| 3,542,460 A | 11/1970 | Smith et al. | |
| 4,153,347 A | 5/1979 | Myer | |
| 5,098,180 A | 3/1992 | Tobey | |
| 5,321,442 A | 6/1994 | Albanese | |
| 5,467,148 A | 11/1995 | Conway | |
| 5,515,116 A | 5/1996 | Bernheiser | |
| 5,587,747 A | 12/1996 | Bernheiser | |
| 5,726,732 A | 3/1998 | Kobayashi | |
| 7,234,808 B2 | 6/2007 | Bruck | |
| 7,645,040 B2 | 1/2010 | Habermann | |
| 7,690,786 B2 | 4/2010 | Wied et al. | |
| 7,712,894 B2 | 5/2010 | Tsai | |
| 2005/0151925 A1 | 7/2005 | Chen | |
| 2006/0132705 A1* | 6/2006 | Li | 351/90 |
| 2009/0279047 A1 | 11/2009 | Tsai | |

FOREIGN PATENT DOCUMENTS

| | | |
|---|---|---|
| CN | 2296022 Y | 1/1998 |
| CN | 201837791 U | 5/2011 |
| DE | 91 02 226 U1 | 6/1992 |
| DE | 201 01 580 U1 | 10/2001 |
| EP | 0532412 | 3/1993 |
| GB | 734208 | 7/1955 |
| GB | 957697 | 5/1964 |
| GB | 2 385 942 A | 9/2003 |
| NZ | 286310 | 7/1998 |
| NZ | 300967 | 6/2000 |
| NZ | 532867 | 3/2006 |
| WO | WO 94/11774 | 5/1994 |
| WO | WO 95/13558 | 5/1995 |
| WO | WO 2006/113949 | 11/2006 |
| WO | WO 2007/045950 | 4/2007 |
| WO | WO 2009/062790 | 5/2009 |

OTHER PUBLICATIONS http://www.squidoo.com/gatorz-sunglasses.
Extended European Search Report mailed Apr. 10, 2014 in European Application No. 11786963.6 (6 pages).
Chinese Office Action and English Translation for corresponding Chinese Application No. 201180025770.6, mailed Nov. 1, 2013, 14 pages.
International Search Report for PCT/NZ2011/000085 mailed Sep. 6, 2011.
International Preliminary Report on Patentability mailed May 18, 2012.
Examination Report for corresponding New Zealand Application No. 585644, dated May 31, 2011, 3 pages.

* cited by examiner

MODULE EYE GLASSES

This application is the U.S. national phase of International Application No. PCT/NZ2011/000085 filed 24 May 2011 which designated the U.S. and claims priority to NZ 585644 filed 26 May 2010, the entire contents of each of which are hereby incorporated by reference.

FIELD OF INVENTION

The invention relates to the field of modular eyeglasses. More particularly, the invention relates to eyeglasses comprising interchangeable elements.

BACKGROUND TO THE INVENTION

A huge number of the world's population wears eyeglasses in some form. The term "eyeglasses" generally refers to a device in which lenses are worn in front of the eyes, including but not limited to: spectacles for vision correction; sunglasses for solar protection and safety glasses for eye protection.

Eyeglasses generally comprise a frame for bearing the optically transparent lenses and positioning them appropriately in front of the eyes of the wearer. The frame of eyeglasses generally comprises at least some of the following components: rims to which the lenses are attached; arms or temples which are placed over the ears of the wearer; and a bridge which connects the two lenses (or their rims) together. Part of the frame, typically but not always the bridge, is adapted to rest on the nose of a wearer.

Eyeglasses have evolved over the years from being a purely functional item to being a fashion accessory. The style of eyeglasses has evolved accordingly, in terms of their shape, size and colour. Nowadays, people often desire to have more than one pair of eyeglasses to suit use in different situations, to complement different outfits or simply for the sake of variety. However, the high price of eyeglasses prevents this being a practicable option for many people.

One way in which the style of eyeglasses can be varied relatively cheaply is with interchangeable parts. For example, U.S. Pat. No. 7,690,786 describes eyeglasses having temple arms and a bridge that can quickly and easily be removed and replaced by like parts of a different colour.

WO 95/13558 describes eyeglasses having interchangeable lenses for varying the type of lens according to the requirements of the situation, for example for long distance or short distance viewing, or for protecting from the glare of the sun. The lenses may also be used with eyeglass frame parts of a different colour or style.

These prior art systems do provide some ability to change the style and colour of eyeglasses, but the degree of customisation that is possible is limited. For example, the ability to change the bridge and temple arms only allows the style of eyeglasses to be changed to the extent allowed by changes in the style of those parts.

Furthermore, prior art eyeglass systems having interchangeable parts have been found to be weaker and more flimsy than is desirable for a product designed for long-term use, especially at the join of interchangeable parts.

Where a range of eyeglass styles are available, manufacturers, distributors and retail outlets need to hold enough stock in each style to be able to keep up with demand. Where some styles are unpopular, all the stock in these styles may not be sold and would therefore be disposed of, which is wasteful. Fashion moves on quickly so even popular styles are prone to obsolescence.

Existing methods of manufacturing eyeglasses, including eyeglasses with interchangeable parts, require complex tooling, which impacts on the cost of production. Where components of eyeglasses are injection moulded, the moulding process is made more complex and more expensive where the use of sliding cores or sliding wedges is required. For example, most eyewear frames require grooves around the inner edges of the eye sockets to enable the lens to fit firmly in the frame. These grooves require complex sliding cores to be used in the moulding process. Tooling having such sliding cores is more expensive and has more moving parts than tools without sliding cores, meaning they are susceptible to more wear and tear.

OBJECT OF THE INVENTION

It is an object of the invention to provide an eyeglass assembly that overcomes at least some of disadvantages discussed above.

Alternatively, it is an object to provide eyeglass parts that overcome at least some of disadvantages discussed above.

Alternatively, it is an object of the invention to at least provide the public with a useful choice.

SUMMARY OF THE INVENTION

According to a first aspect of the invention, there is provided an eyeglass assembly formed of detachable parts, the detachable parts comprising:
  at least one lens portion;
  an upper frame part;
  a lower frame part, the upper frame part and the lower frame part together defining at least one aperture for receiving the at least one lens portion; and
  two temple arms attached to the upper frame part and the lower frame part,
  wherein the detachable parts are each interchangeable with corresponding parts.

It will be understood that, in the context of the invention described herein, a "detachable" part is a part that can readily be detached from the eyeglass assembly or from another part of the eyeglass assembly. The part may be detached with or without the use of a tool and in a way that does not damage the part such that it can be subsequently reattached.

It will further be understood that the interchangeability of detachable parts with corresponding parts implies that any detachable part can be replaced in the eyeglass assembly with a part that performs broadly the same function but may differ in terms of shape, size, colour or any other property.

Preferably, the temple arms are detachably pivotally engaged with the upper frame part and the lower frame part.

In a preferred embodiment, the eyeglass assembly comprises first and second hinge members, the first hinge member comprising a pivot shaft and the second hinge member comprising a pivoting means. In one embodiment, the upper and lower frame parts together comprise the first hinge member and the temple arms each comprise a second hinge member. In an alternative embodiment, the upper and lower frame parts together comprise the second hinge member and the temple arms each comprise a first hinge member.

More preferably, the pivoting means comprises at least one hooked member adapted to allow rotation of the second hinge member around the pivot shaft of the first hinge member.

Preferably, the pivot shaft comprises an upwardly projecting portion and a downwardly projecting portion.

Preferably, the upwardly projecting portion and the downwardly projecting portion of the pivot shaft are of unitary construction.

Preferably, the upper frame part comprises the pivot shaft.

Preferably, the lower frame part comprises a pivot shaft receiving portion adapted to receive the downwardly projecting portion of the pivot shaft such that the pivot shaft extends downwards from the pivot shaft receiving portion.

Preferably, the upper and lower frame parts are detachably connected by co-operating male and female portions. More preferably, the co-operating male and female portions may comprise the pivot shaft and pivot shaft receiving portion.

Preferably, the second hinge member comprises upper and lower hooked members adapted to co-operate with the upwardly projecting portion and downwardly projecting portion of the pivot shaft respectively.

In another embodiment, the upper frame part and/or lower frame part comprise(s) aperture portions, each aperture portion comprising an aperture. Each temple arm comprises a pivot shaft detachably pivotally engaged with the apertures in the upper frame part and the lower frame part.

Preferably, the eyeglass assembly comprises biasing means to bias the temple arms to at least one position in relation to the upper frame part and/or lower frame part. In one embodiment, the temple arms are biased to a first position in relation to the upper and/or lower frame parts. The first position may be described as an 'open' position, wherein the eyeglass assembly is in a configuration suitable for placing on the face of a wearer. Furthermore, the temple arms may be biased to a second position in relation to the upper and/or lower frame parts. The second position may be described as a 'closed' position, wherein the eyeglass assembly is in a folded configuration and is not suitable for placing on the face of a wearer.

In one embodiment, the pivot shafts comprise a substantially square-shaped cross-section portion, each pivotally received by a substantially square-shaped aperture. More preferably, the substantially square-shaped apertures have rounded corners. Other cross-sectional shapes of the pivot shaft and aperture are also included within the scope of the invention.

In one embodiment, the aperture portions may comprise a split between the aperture and the outside of the aperture portion. Preferably, the split is adapted to allow the aperture portions to flex upon rotation of the pivot shaft in the aperture. In some embodiments, for example where the aperture portion is formed of a material that flexes as the pivot shaft is rotated, a split is not provided.

In one embodiment, each temple arm has a pivot shaft having a circular portion and a square-shaped portion. The pivot shafts are received by circular apertures in aperture portions of the lower frame part and square-shaped apertures having rounded corners in aperture portions of the upper frame part. As will be appreciated by those of skill in the art, this embodiment is non-limiting and other embodiments of the invention include different configurations of pivot shafts and apertures in components of the eyeglass assembly.

Preferably, the upper frame part and the lower frame part are detachably attached at a centre portion thereof. The centre portions of the upper and lower frame parts define a bridge portion of the eyeglass assembly.

Preferably, the upper frame part and lower frame part are detachably attached at a centre portion by co-operating male and female portions.

In one embodiment, the co-operating male and female portions comprise a split shaft connection. The split shaft and aperture receiving the split shaft may be comprised by the upper frame part and lower frame part respectively, or vice versa. Other embodiments do not comprise a split in a shaft or male attachment means. For example, embodiments using a material that flexes to allow the shaft to be detachably received in the aperture.

In one embodiment, the eyeglass assembly comprises one or more nose resting portions adapted to rest on a nose of a wearer.

Preferably, the lower frame part comprises the one or more nose resting portions. For example, the bridge portion may comprise the one or more nose resting portions. The one or more nose resting portions may be detachable from the lower frame part, or may be of unitary construction therewith.

Alternatively, the eyeglass assembly comprises a nose resting portion detachably attached to the upper frame part.

In one embodiment, the at least one lens portion comprises two lenses.

In an alternative embodiment, the at least one lens portion comprises a lens assembly. The lens assembly may comprise a mono lens or the lens assembly may comprise one or more lenses within a sub-frame.

Preferably, the at least one aperture defined by the upper frame part and the lower frame part substantially entirely surround(s) the at least one lens received in the aperture(s).

More preferably, only when the upper frame part and the lower frame part are attached together do they define the at least one aperture.

Preferably, the detachable upper and lower frame parts may be interchanged such that the eyeglass assembly selectively comprises at least one lens portion of different shapes and/or sizes.

According to a second aspect of the invention, there is provided an upper frame part adapted for use in an eyeglass assembly according to the first aspect of the invention.

According to a third aspect of the invention, there is provided a lower frame part adapted for use in an eyeglass assembly according to the first aspect of the invention.

According to a fourth aspect of the invention, there is/are provided one or more temple arms adapted for use in an eyeglass assembly according to the first aspect of the invention.

According to a fifth aspect of the invention, there is/are provided one or more nose resting portions adapted for use in an eyeglass assembly according to the first aspect of the invention.

According to a sixth aspect of the invention, there is provided a component part of an eyeglass assembly formed of a heat dissipating material.

Preferably, one or more temple arms are at least partially formed of a heat dissipating material.

In one embodiment, the temple arm(s) are substantially entirely formed of the heat dissipating material. Alternatively, a part of the temple arm(s) is formed of the heat dissipating material. For example, each temple arm may have an insert formed of heat dissipating material, the insert being preferably positioned on a side adapted to be positioned proximate to and facing a wearer's head.

Preferably, the heat dissipating material is any substance that has a thermal conductivity suitable for conducting heat away from the wearer's head or face. Non-limiting examples of such a substance include heat dissipating polymers and heat dissipating aluminium.

Preferably, the one or more temple arms at least partially formed of a heat dissipating material is/are adapted for use in an eyeglass assembly according to the first aspect of the invention.

According to a seventh aspect of the invention, there is provided a kit of parts for constructing the eyeglass assembly according to the first aspect of the invention.

According to an eighth aspect of the invention, there is provided a method of manufacturing an eyeglass assembly comprising the steps of:
- injection moulding, without the use of sliding cores, detachable parts comprising:
  - an upper frame part; and
  - a lower frame part;
- providing two temple arms;
- providing at least one lens portion, wherein the upper frame part and the lower frame part together define at least one aperture for receiving the at least one lens portion; and
- assembling the detachable parts and at least one lens portion together to form the eyeglass assembly,
- wherein the detachable parts are each interchangeable with corresponding parts.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which.

DETAILED DESCRIPTION OF PREFERRED EMBODIMENTS OF THE INVENTION

The invention is broadly directed to a modular eyeglass system comprising a number of interchangeable parts that are adapted to be connected together to form an eyeglass assembly. The interchangeability of the parts allows a wearer, manufacturer, designer, distributor and/or retailer to vary the shape, style, size or colour of the eyeglasses to suit their requirements.

Figure 1:
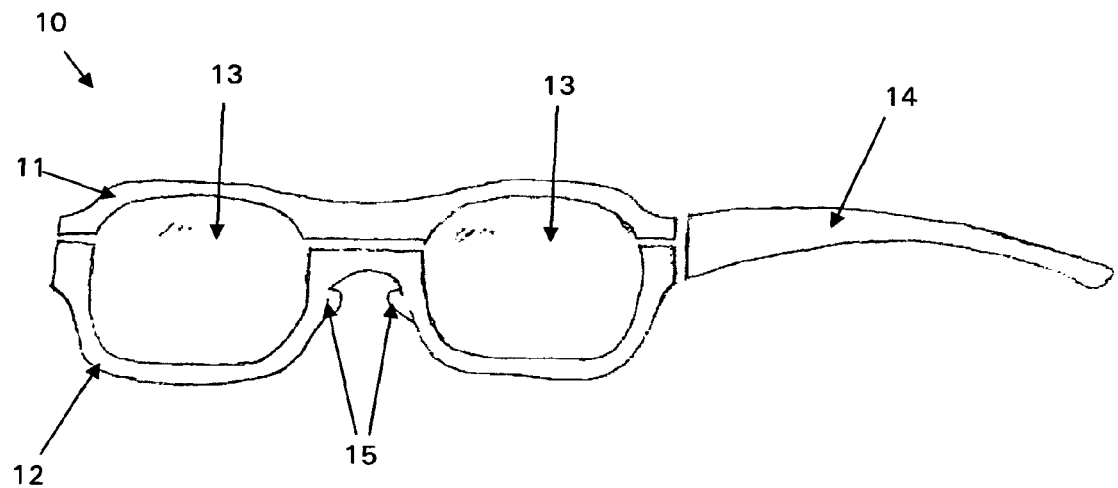
FIG. 1 is an illustration of an eyeglass assembly according to an embodiment of the invention.
Figure 2:
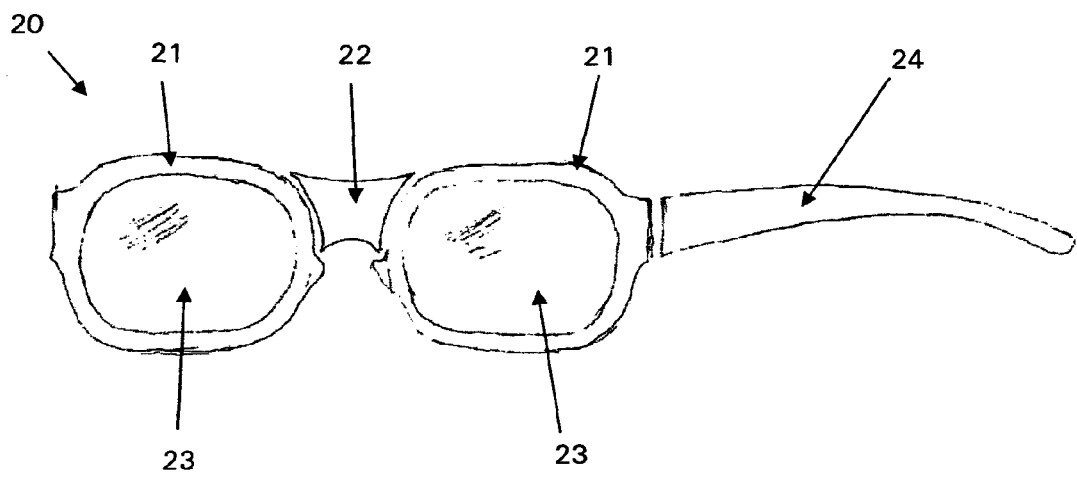
FIG. 2 is an illustration of an eyeglass assembly according to another embodiment of the invention.

FIGS. 1 and 2 illustrate eyeglasses according to different embodiments of the invention. Different arrangements and combinations of detachable and interchangeable parts comprise eyeglass assemblies. While preferred embodiments are discussed below, it will be understood that other arrangements and combinations of detachable and interchangeable parts are also within the scope of the invention.

FIG. 1 illustrates the arrangement of parts in an eyeglass assembly 10. Assembly 10 comprises an upper frame part 11, a lower frame part 12, lenses 13 and temple arms 14. Only one of the temple arms is shown in FIG. 1. The parts comprising assembly 10 are all readily detachable and may be interchanged with corresponding parts that perform broadly the same function, or serve the same purpose, but may differ in terms of shape, style, size, colour or any other property.

The invention is not limited to the manner in which constituent parts of the eyeglass assembly are detachably attached. While preferred embodiments are discussed below, it will be apparent to one of skill in the art that other methods are also intended and are within the scope of the invention. The constituent parts may be detached and attached with or without the use of a tool. Being able to do so without the use of a tool enables ease of use but the connections may, in some cases, be weak. The use of a tool enables stronger attachments but requires a user to carry a tool around with them, which may add to the cost of the product and can easily be lost.

Upper frame part 11 forms an upper portion of eyeglass assembly 10 and, in preferred embodiments such as that shown in FIG. 1, spans the width of the front section of eyeglass assembly 10, connecting to temple arms 14 on either side thereof. Lower frame part 12 forms a lower portion of assembly 10 and also, in preferred embodiments, spans the width of the front section of eyeglass assembly 10, connecting to temple arms 14 on either side. Other embodiments comprise different configurations of upper and lower frame parts thereof.

Upper and lower frame parts 11 and 12 are detachably attached to each other at either end, proximate to temple arms 14, and also at a centre portion where, in the embodiment shown in FIG. 1, they together form a bridge portion.

When connected together, upper and lower frame parts 11 and 12 define two apertures, each aperture being adapted to receive a lens 13, as shown in FIG. 1. Upper and lower frame parts 11 and 12 may comprise grooves on the inner side of their curved sections, the grooves receiving edges of the lenses 13 so that the lenses 13 are securely held in place in the frame assembly.

In the embodiment shown in FIG. 1, the upper and lower frame parts 11 and 12 entirely surround lenses 13. However, in other embodiments lenses 13 may not be entirely surrounded, for example to give the eyeglasses a more "rimless"

look. That is, the edge of lenses 13 may be visible and not received by upper and lower frame parts 11 and 12.

In the embodiment shown in FIG. 1, it is only when upper and lower frame parts 11 and 12 are attached that the two apertures are defined; separately upper and lower frame parts 11 and 12 only define parts of the apertures. In other embodiments, the upper frame part or the lower frame part may define one or more apertures adapted to receive lenses on its own. For example, the lower frame part may comprise two rims surrounding lenses with a bridge portion between the rims. This lower frame part may be detachably attached to an upper frame part.

It will be understood by those of skill in the art that many arrangements of constituent parts, including those described above, are included within the scope of the invention. Different combinations of the parts discussed in these embodiments may be used to provide much variety in style, shape and size.

In the embodiment shown in FIG. 1 both upper frame part 11 and lower frame part 12 detachably attach to temple arms 14. In other embodiments, only the upper frame part attaches to the temple arms and in still other embodiments, only the lower frame part attaches to the temple arms. Attaching both upper frame part and lower frame part to the temple arms, as in eyeglass assembly 10, has been found to increase the strength of the assembly. Preferred but non-limiting methods of attaching the temple arms to the upper and/or lower frame part are discussed further below.

In the embodiment shown in FIG. 1, lower frame part 12 comprises nose resting portions 15 that are adapted to rest on the nose of a wearer. Nose resting portions 15 are of unitary construction with lower frame part 12. In other embodiments, nose resting portions 15 may be detachable attached to lower frame part 12 and may be interchangeable with other nose resting portions to permit a wearer to tailor these components according to their requirements. For example, different shaped or sized noses may require different size or positioning of nose resting portions. In still another embodiment, the upper frame part may comprise a nose resting portion.

FIG. 2 illustrates the arrangement of parts in an eyeglass assembly 20 according to an alternative embodiment of the invention. Eyeglass assembly 20 comprises right and left lens frames 21, bridge portion 22, right and left lenses 23 and temple arms 24. Again, only one temple arm 24 is shown in FIG. 2. Each component part of eyeglass assembly 20 is detachably attached to other component parts and each part is interchangeable with corresponding parts to allow the wearer to tailor the eyeglasses according to their requirements in terms of shape, size, style and colour.

Figure 3:
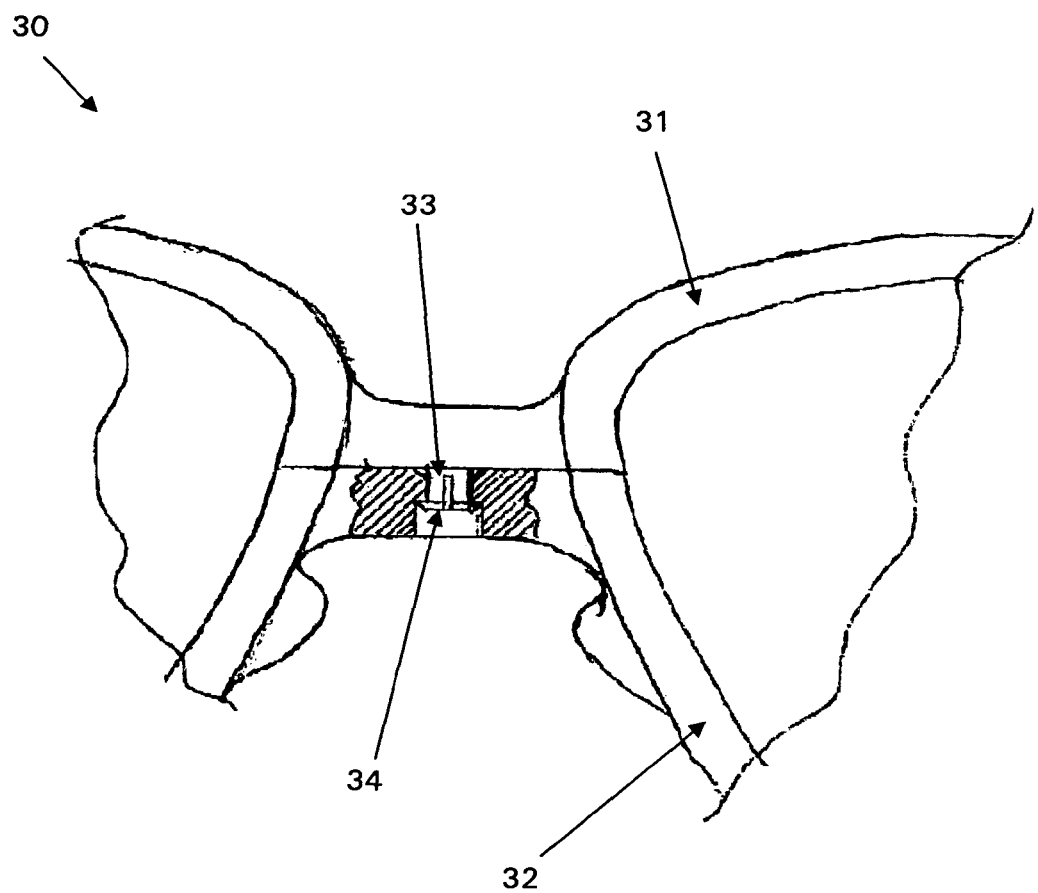
FIG. 3 is an illustration in part cross-section of an eyeglass assembly according to an embodiment of the invention.

FIG. 3 is an illustration in part cross-section showing one manner of detachably attaching an upper frame part to a lower frame part in an eyeglass assembly 30 according to an embodiment of the invention. Only the bridge portion and parts of the lenses and upper and lower frame parts 31 and 32 are shown in FIG. 3.

In FIG. 3, upper frame part 31 and lower frame part 32 are connected using a male-female attachment means, in this embodiment a split shaft connection. Upper frame part 31 comprises a split shaft 33 and lower frame part 32 comprises an aperture 34 adapted to receive split shaft 33. Split shaft 33 may comprise two portions separated by a vertical slit in it which allows it to flex for the purposes of passing through aperture 34. In other embodiments, a flexible material is used so the slit may not be required. The split shaft may also have a small flange proximate to one end to secure the attachment between frame parts. In an alternative embodiment, the lower frame part comprises a split shaft and the upper frame part comprises an aperture for receiving the split shaft. This split shaft connection provides a secure connection between upper and lower frame parts, but in a detachable manner.

It will be understood that, as with all detachable attachments discussed herein, other attachment methods are envisaged, including other connections having male and female parts, and are included within the scope of the invention.

Figure 4:
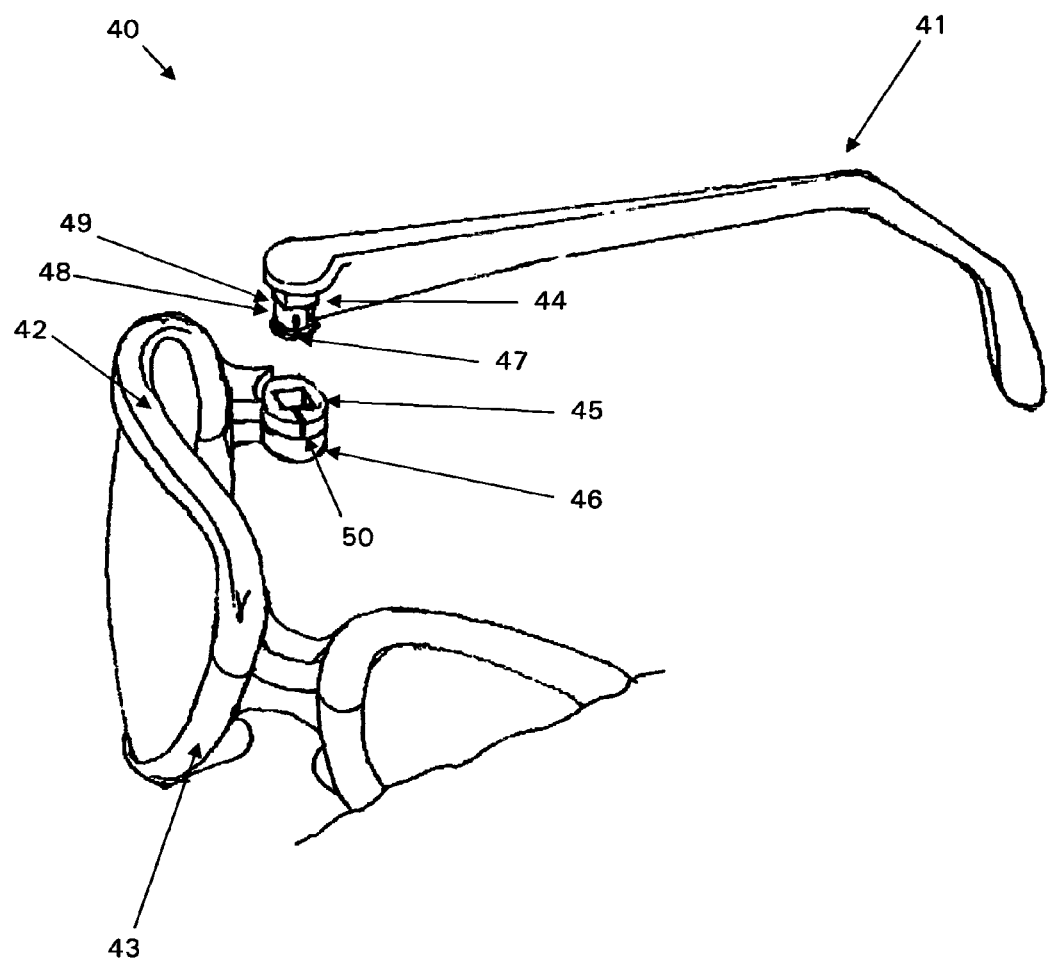
FIG. 4 is an illustration of part of an eyeglass assembly according to an embodiment of the invention.
Figure 5:
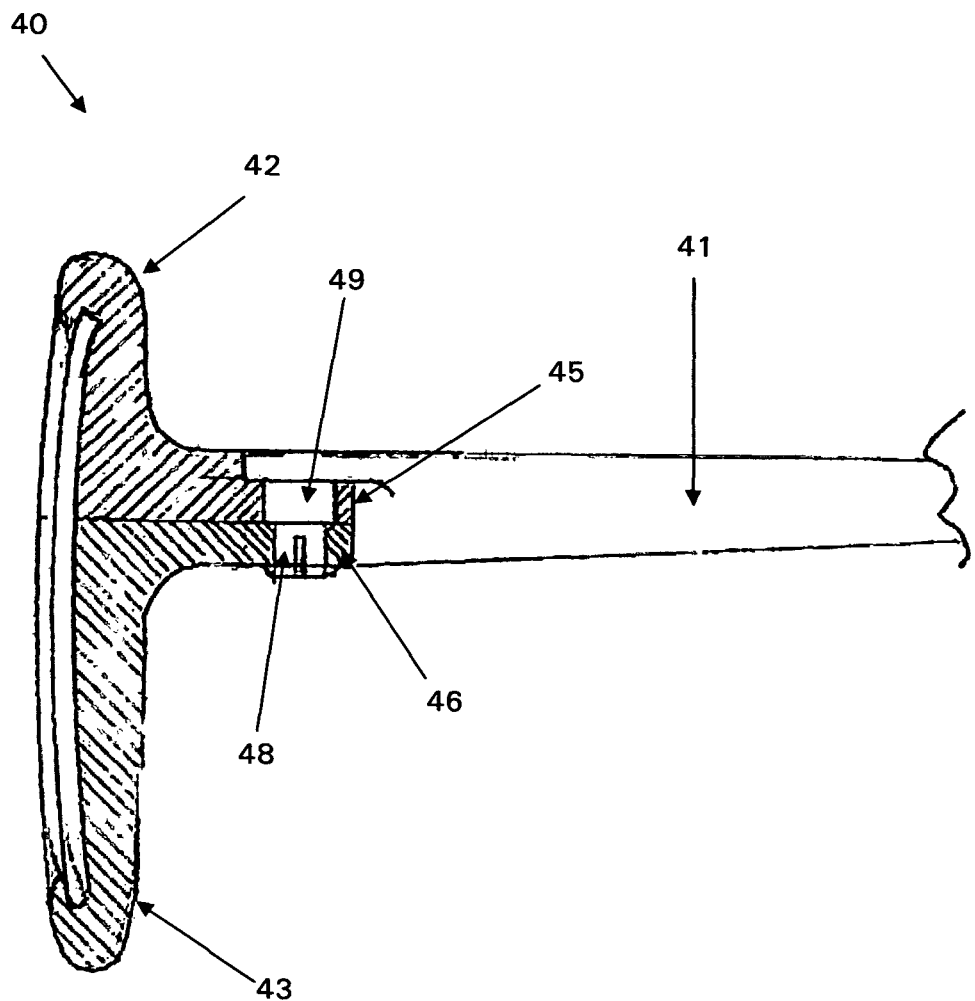
FIG. 5 is an illustration in part cross-section of the eyeglass assembly shown in FIG. 4.

FIGS. 4 and 5 illustrate one manner of detachably attaching temple arms 41 in an eyeglass assembly 40. Temple arms 41 are detachably pivotally attached to upper frame part 42 and/or lower frame part 43. In the preferred embodiment shown in FIGS. 4 and 5, temple arms 41 are attached to both upper frame part 42 and lower frame part 43 because this has been found to increase the strength of eyeglass assembly 40. As previously discussed, in other embodiments the temple arms connect to only one of the upper or lower frame part.

Temple arms 41 are interchangeable, that is, they are adapted to be detached from eyeglass assembly 40 without damage and re-attached or replaced with corresponding temple arms also adapted to attach to the rest of eyeglass assembly 40. This allows eyeglass wearers to adapt temple arms to suit their needs, for example, by varying the shape, style, size or colour. In particular, temple arms causing eyeglasses to be worn at differing angles can be selected, as is often required as different people have different relative positions of ears and noses.

In the following discussion of the embodiment shown in FIGS. 4 and 5, a pivot shaft and aperture connection is described, with temple arms comprising pivot shafts and upper and lower frame parts comprising aperture portions. It will be understood that this arrangement of hinge members is commutable, that is the temple arms may comprise aperture portions and the upper and lower frame parts comprise pivot shafts, and both arrangements are included within the scope of the invention. The embodiment of FIGS. 4 and 5 is discussed by way of non-limiting example only. Furthermore, other methods of detachably pivotally engaging temple arms with eyeglass frame parts are also included within the scope of the invention.

In the embodiment of FIGS. 4 and 5, temple arms 41 each comprise a pivot shaft 44 and upper frame part 42 and lower frame part 43 each comprise aperture portions 45 and 46 respectively at each end. Aperture portions 45 and 46 comprise flattened portions with apertures therein adapted to receive pivot shaft 44. On insertion of pivot shaft 44 into the apertures in aperture portions 45 and 46, temple arm 41 can pivot with respect to upper and lower frame parts 42 and 43.

Pivot shaft 44 comprises two portions, which may be separated by a slit 47 which allows greater ease of inserting pivot shaft 44 into the apertures and also greater ease in disengaging it. It may also have a small flange proximate to one end to prevent temple arm 41 being easily disengaged from the upper and/or lower frame parts.

The temple arms may be biased to a first position in relation to the upper and lower frame parts. This first position is when the eyeglasses are in an "open" configuration and are suitable for placement on a wearer's head. The temple arms may additionally or alternatively be biased to a second position in relation to the upper and lower frame parts. This second position is when the eyeglasses are in a "closed" or folded configuration and the temple arms are aligned adjacent to the upper and lower frame parts. The eyeglass assembly comprises biasing means for this purpose.

One example of a manner in which this biasing may be achieved is illustrated in FIGS. 4 and 5. Pivot shaft 44 has first pivot shaft portion 48 having a circular cross-section and a second pivot shaft portion 49 having a substantially square-shaped cross-section. The apertures in the aperture portions of upper and lower frame parts are shaped correspondingly. Aperture portion 45 has an aperture with a substantially square shaped cross-section and aperture portion 46 has an aperture with a circular cross-section.

Figure 6:
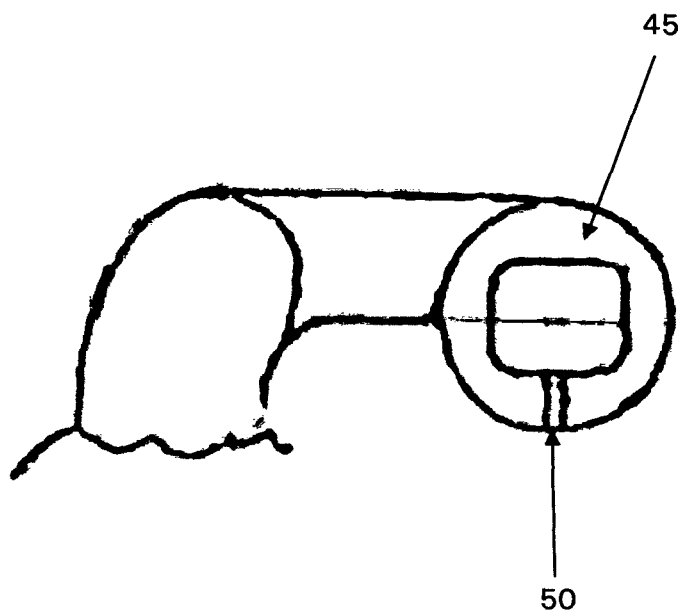
FIG. 6 is an illustration of part of an eyeglass assembly according to an embodiment of the invention.
Figure 7:
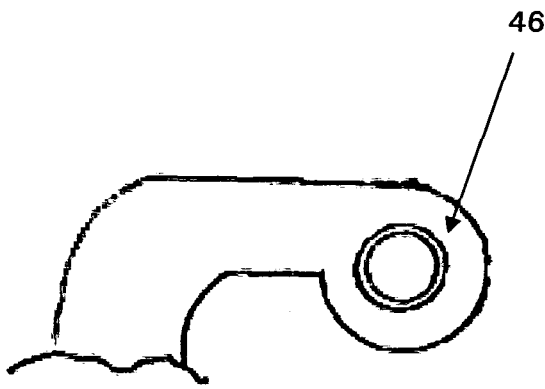
FIG. 7 is an illustration of part of an eyeglass assembly according to another embodiment of the invention.

FIGS. 6 and 7 illustrate aperture portions 45 and 46 respectively, showing the aforementioned apertures.

When temple arm 41 is inserted into the apertures, the pivot shaft portions are received in the correspondingly shaped aperture, as shown in FIG. 5. Because of the square-shaped portion of the pivot shaft, temple arm 41 is biased to two positions at substantially 90° angular separation from each other, which correspond to the open and closed configurations.

Aperture portion 45 preferably includes a slit 50 to allow aperture portion 50 to flex slightly upon rotation of the square-shaped pivot shaft portion 49 therein. Furthermore, the substantially square-shaped aperture in aperture portion 45 may have slightly rounded corners to ease pivotal movement of temple arm 41.

Aperture portion 46 may have a circular aperture having an angled opening, such as shown in FIG. 7, to make insertion of the pivot shaft into the aperture easier.

Other embodiments include different arrangements that enable pivotal movement between the temple arms and the eyeglass assembly frame. For example, the square and circular shaped apertures may be arranged the other way around, with the corresponding portions of the pivot shaft correspondingly arranged. In another embodiment, only a circular cross-section is used and an alternative biasing means is used, as will be appreciated by one of skill in the art. In a yet further embodiment, the temple arm has a pivot shaft extending in an upwards direction instead of in the downwards direction as shown in the figures.

Other shaped cross-sections of pivot shafts and apertures are also included within the scope of the invention, those discussed above are provided merely by way of example.

In some embodiments, the interchanging of frame parts, for example upper and lower frame parts, enables the eyeglass assembly to selectively be adapted to receive lenses having different shapes and/or sizes. For example, in one embodiment, eyeglasses are comprised of circular lenses that are received by upper and lower frame parts. By interchanging the upper and/or lower frame part with one of a different shape, the frames of the eyeglasses can be adapted to be suitable for receiving oval non-circular lenses, for example "aviator" style lenses.

Figure 8:
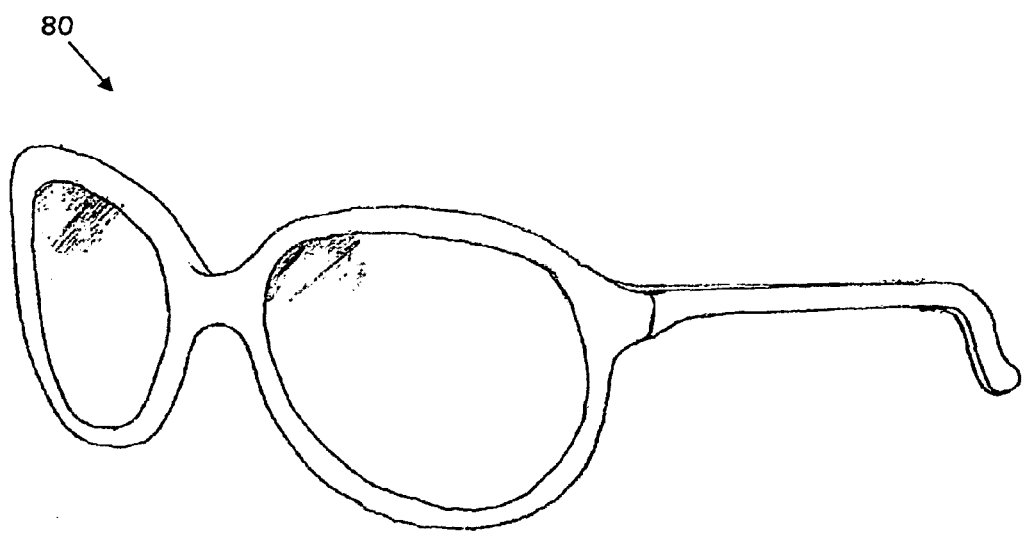
FIG. 8 is an illustration of an eyeglass assembly according to an embodiment of the invention.
Figure 9:
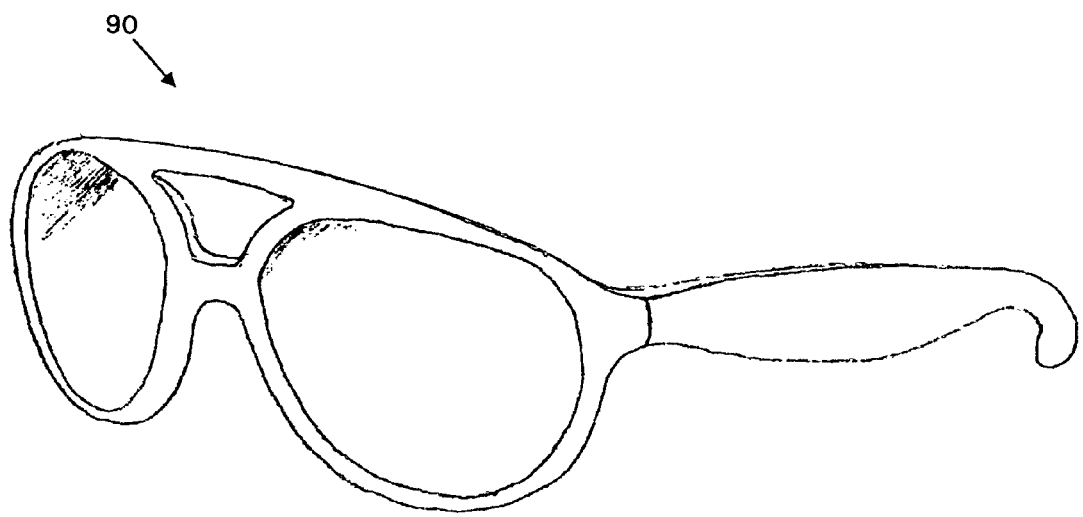
FIG. 9 is an illustration of the eyeglass assembly shown in FIG. 8 with parts interchanged.
Figure 10:
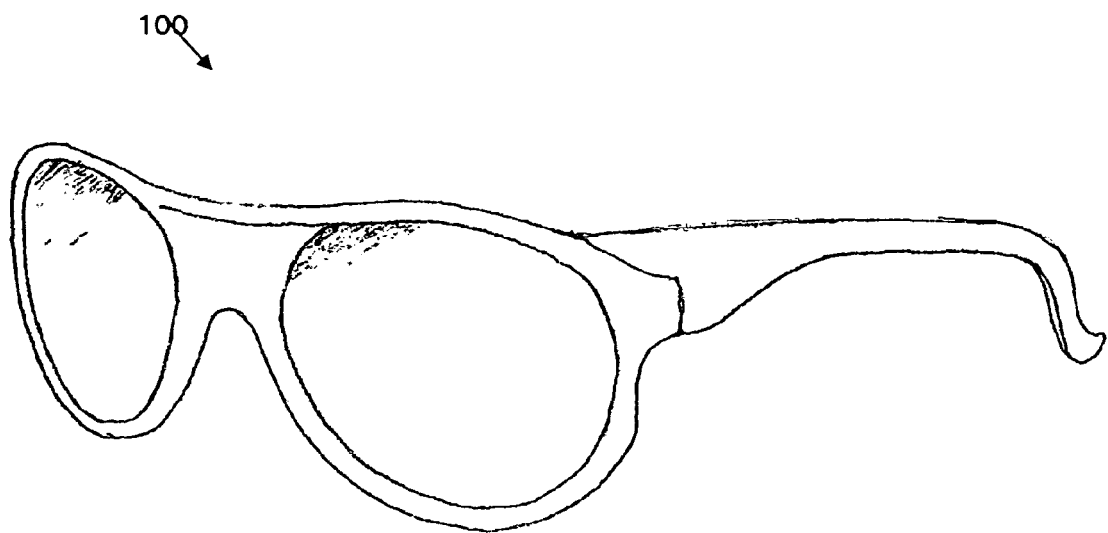
FIG. 10 is a further illustration of the eyeglass assembly shown in FIG. 8 with parts interchanged.

FIGS. 8, 9 and 10 illustrate eyeglasses 80, 90 and 100 having different shapes and styles but being formed of some common constituent parts, such that one can be interchanged into another by interchanging one or more parts, in accordance with one embodiment of the invention. Eyeglasses 80, 90 and 100 have the same lower frame parts and lenses but the upper frame parts and temple arms have been interchanged.

As can be seen, using such an eyeglass assembly and appropriate interchangeable parts the shape and style of the eyeglasses can be quickly and easily significantly altered. A consumer only needs to buy one set of eyeglasses and four sets of replacement parts (two extra upper frame parts and two extra sets of temple arms) to be able to alter the eyeglasses in this way. This will be cheaper for the consumer compared to if they had to buy nine separate eyeglasses. It also permits more flexibility as, in this example, different temple arms can be used with different upper frame parts.

It can be seen that relatively few interchangeable parts need to be purchased to allow a large number of permutations in style and shape of eyeglasses. Furthermore, retail outlets can more effectively manage the number of parts of each style or shape they hold in store according to demand, thus reducing the amount of waste.

In one embodiment of the invention, the eyeglass assembly frame, parts thereof and/or temple arms are formed from a heat dissipating material. The heat dissipating material is adapted to conduct heat away from the skin of a wearer to help keep them cool. Preferably, parts of the eyeglass assembly adjacent to a wearer's skin are formed of the heat dissipating material.

In a preferred embodiment, the temple arms are formed of the heat dissipating material. Alternatively, a part of the temple arms are formed of the heat dissipating material, such as an insert portion on an inner side of the temple arms.

Non-limiting examples of heat dissipating materials suitable for use in such a way are heat dissipating polymers and heat dissipating aluminium.

Figure 11:
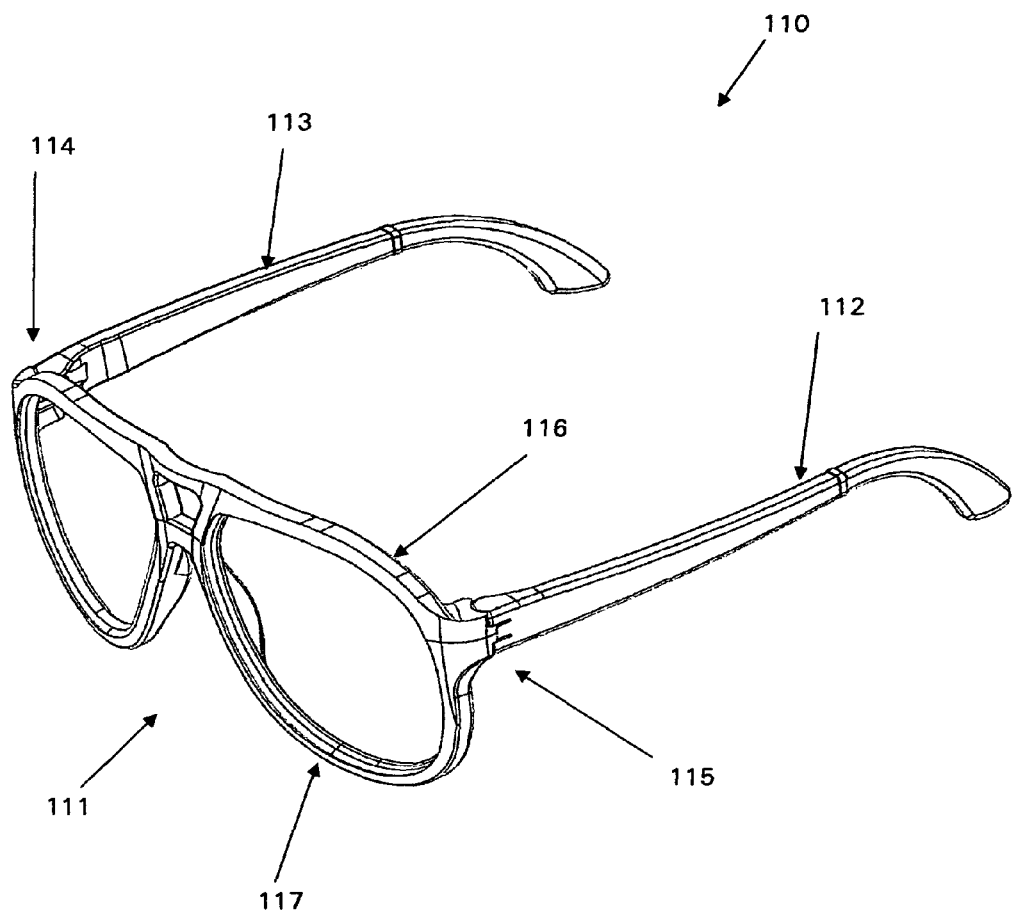
FIG. 11 is a perspective view illustration of an eyeglass assembly according to another embodiment of the invention.

FIG. 11 is a perspective view illustration of an eyeglass assembly 110 according to another embodiment of the invention. Assembly 110 comprises a frame 111 and temple arms 112, 113 (shown in an open configuration in FIG. 11). Frame 111 comprises lens receiving portions adapted to receive eye lenses.

Temple arms 112, 113 are pivotally connected to frame 111 by means of hinge assemblies or connections 114, 115. Hinge connections 114, 115 allow rotational movement of temple arms 112, 113 relative to frame 111. In FIG. 11, temple arms 112, 113 are shown in an open or unfolded position and may be placed on a wearer's face. When folded to a closed position, the eyeglass assembly is compact for storage. At the extremes of movement of temple arms 112, 113, they are in the fully open and closed positions. The fully open and closed positions may be defined through movement limiters. For example, in some embodiments, the temple arms are closed to the extent that they come into contact with frame 111, which defines the fully closed position. In other embodiments, hinge connections 114, 115 comprise rotation limiting portions, examples of which will be described in more detail below, to define the fully open and/or closed positions.

Temple arms 112, 113 are detachably connected to frame 111. Being able to detach the temple arms allows them to be interchanged with other temple arms so the style, colour and/or shape of the eyeglasses can be modified to suit user requirements. Frame 111, or portions thereof, may also be interchanged with like components.

In the embodiment shown in FIG. 11, temple arms 112, 113 are difficult to disconnect in normal use, that is, without using extreme and potentially damaging force, therefore they are securely connected during normal use. Each temple arm may be disconnected from frame 111 by deforming each arm in the direction of frame 111. By bending a temple arm in such a way re-positions parts of the hinge assembly, as will be described in more detail below, so that the temple arm and frame can slide apart with relative ease. During normal use of a pair of eyeglasses a temple arm is unlikely to be deformed in such a way, therefore the temple arms are unlikely to fall off during normal use.

In an alternative embodiment, frame 111 may be able to be deformed to accept or disconnect the temple arms.

In the preferred embodiment shown in FIG. 11, frame 111 comprises an upper frame part 116 and a lower frame part 117. Upper frame part 116 is detachably connected to lower frame part 117. In one embodiment, the upper and lower frame parts are connected by means of co-operating male and female friction fit portions. In other embodiments, other means of detachably connecting the upper and lower frame parts are used and it will be understood that the invention is not limited thereto. The upper and lower frame parts are preferably detachably connected so that reasonable force is required to separate them, that is, a user is able to pull them apart but they will not disconnect unintentionally during normal use.

Figure 12:
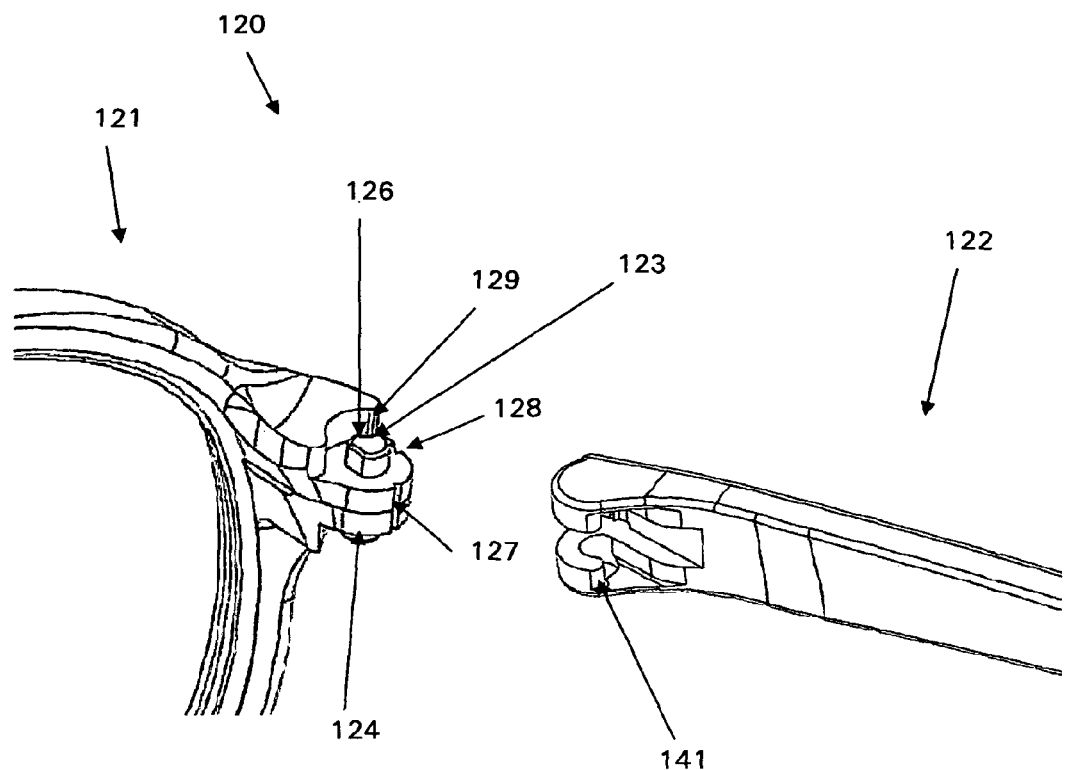
FIG. 12 is a perspective view of an eyeglass hinge assembly according to an embodiment of the invention.

FIG. 12 is a perspective view of an eyeglass hinge assembly 120 according to an embodiment of the invention. Hinge assembly 120 comprises a first hinge member 121 and a second hinge member 122, the hinge members being adapted to pivotally co-operate. In the preferred embodiment shown in FIG. 12, a lens receiving portion of the eyeglasses comprises first hinge member 121 and a temple arm of the eyeglasses comprises second hinge member 122. However, in other embodiments, the lens receiving portion of the eyeglasses comprises second hinge member 122 and the temple arm comprises first hinge member 121. Embodiments of the invention are independent of which eyeglass component comprises which co-operating structure of the hinge assembly.

In the preferred embodiment of FIG. 12, the lens receiving portion makes up the front face of the eyeglasses, and no portion of the temple arms comprises the front face. This may be desirable in some cases. However, it may be desirable in certain circumstances for one end of the temple arms to comprise part of the front face of the eyeglasses. In these circumstances, the lens receiving portion of the eyeglasses may comprise second hinge member 122 and the temple arm may comprise first hinge member 121.

It will be understood to those skilled in the art that the inventive principles of the present invention may be embodied in a number of ways. The embodiments described herein are not limiting to the invention. For example, by altering various aspects of the illustrative embodiments, differing styles, shapes and configurations of eyeglasses may be provided.

First Hinge Member

First hinge member 121 will now be described with reference to FIG. 12 and FIG. 13, which is a plan view illustration of one end of the first hinge member illustrated in FIG. 12. The end shown is the end that co-operates with the second hinge member.

First hinge member 121 comprises a pivot shaft 123. Pivot shaft 123 comprises upwardly and downwardly extending portions that extend upwards and downwards respectively from a limb 124 extending from one end of first hinge member 121. Pivot shaft 123 is positioned centrally with respect to limb 124. There is sufficient width between pivot shaft 123 and a rotation wall portion 125 defined by the extension of limb 124 from first hinge member 121 to permit a hooked member of the second hinge member (described below) to engage the pivot shaft and allow rotation of the second hinge member with respect to the first hinge member.

Figure 13:
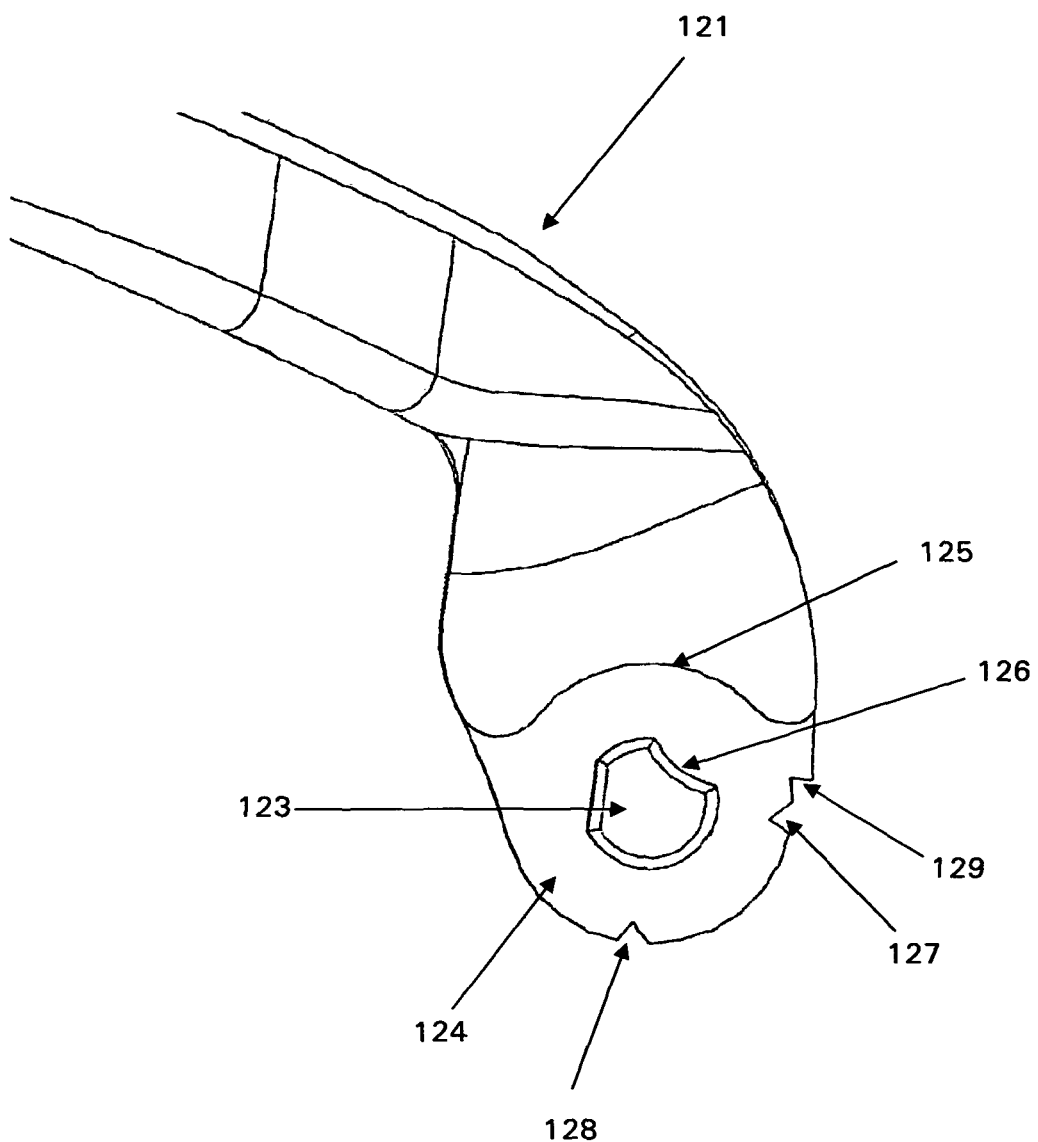
FIG. 13 is a plan view illustration of one end of a first hinge member according to the embodiment of FIG. 12.

The pivot shaft may comprise at least one notch or scallop, such as notch 126 in the upwardly extending portion of pivot shaft 123 shown in FIGS. 12 and 13. A similarly sized and positioned notch is also provided in the downwardly extending portion. Notch 126 has the shape of an arc of a circle. In the case of the embodiment shown in FIG. 13, the circle has a radius slightly larger than the radius of pivot shaft 123. Other embodiments may comprise notches of different sizes and shapes.

Notch 126 is positioned on a surface of pivot shaft 123 facing the rotation wall portion 125. The exact position of the notch may vary according to the angle at which the second hinge member is required to slide out of engagement from the first hinge member, and hence the ease by which the temple arm and lens receiving portion can be disengaged. In the embodiment shown in FIG. 13, a line drawn between the ends of the arc defining notch 126 defines a 58° angle with a line parallel to a straight edge of first hinge member 121.

First hinge member 121 comprises at least one notch, for example notches 127 and 128 in the outer edge of limb 124. Notches 127 and 128 are adapted to co-operate with a protrusion on the second hinge member as will be described below. Notches 127 and 128 are preferably V-shaped, but may be shaped differently in other embodiments. The notches are shallow enough so that a small amount of force is required to move the protrusion of the second hinge member out of the notches.

First hinge member 121 comprises a surface or wall portion 129 adapted to abut a rotation-limiting portion of the second hinge member when the temple arm is in the fully open position.

Second Hinge Member

Figure 14:
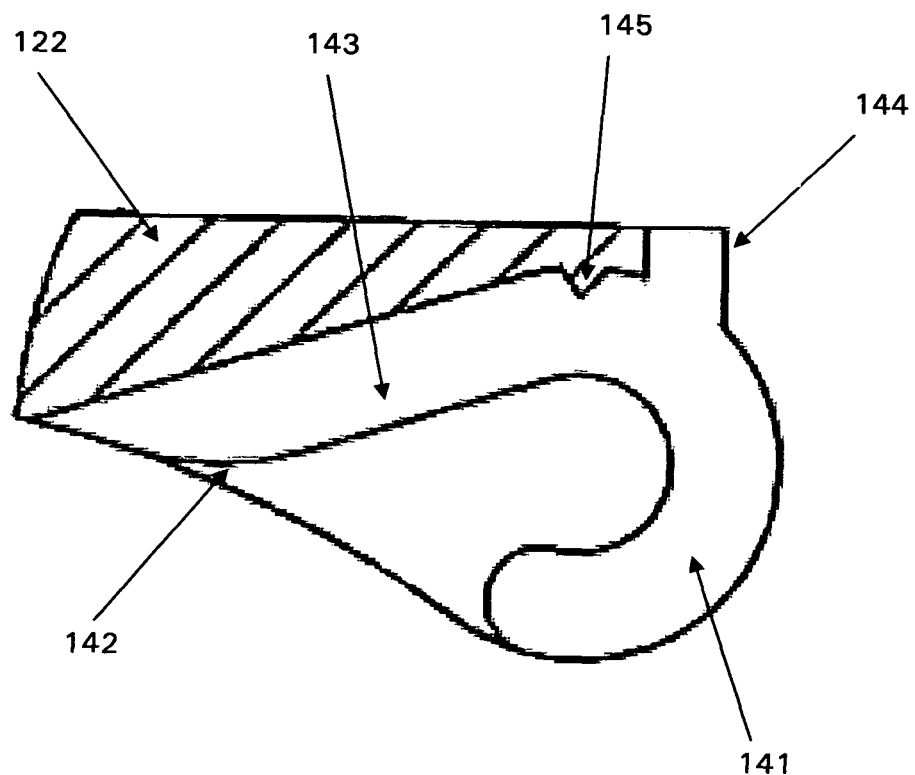
FIG. 14 is a cross-sectional plan view illustration of one end of a second hinge member according to the embodiment of FIG. 12.

Second hinge member 122 will now be described with reference to FIG. 12 and FIG. 14, which is a cross-sectional plan view illustration of one end of the second hinge member illustrated in FIG. 12. The end shown is the end that co-operates with the first hinge member.

Second hinge member 122 comprises pivoting means adapted to pivot with respect to the pivot shaft of the first hinge member. For example, second hinge member 122 comprises at least one hooked member 141. The embodiment shown comprises upper and lower hooked members which co-operate with the upwardly and downwardly projecting portions of the pivot shaft respectively. Between the upper and lower hooked members is defined a channel adapted to receive limb 124 of first hinge member 121 and permit rotation thereof between the hooked members.

Hooked member 141 is adapted to co-operate with pivot shaft 123 and has a thickness that allows rotation of the second hinge member with respect to the first hinge member. The radius of the part circle defined inside hooked member 141 is substantially similar to the radius of pivot shaft 123. In a preferred embodiment, the radius of the part circle defined inside hooked member 141 is slightly smaller than the radius of pivot shaft 123 so that the first and second hinge members rotate with respect to each other with a reasonable amount of friction so that the temple arm is not overly loose. A person of skill in the art will appreciate that the relative dimensions can be varied to suit user requirements.

Hooked member 141 comprises a straight section 143 ending in a bump 142. In the embodiment shown in FIG. 14, straight section 143 defines an 18° angle with respect to the longitudinal axis of the second hinge member. This angle may vary in other embodiments, as will be described below.

Second hinge member 122 comprises a rotation-limiting portion to limit the extent of possible rotation between the first and second hinge members. In preferred embodiments, the rotation-limiting portion defines the fully open position of the temple arm relative to the frame. In such embodiments, the fully closed position is generally defined by contact of the temple arms with the frame. Other embodiments may comprise a further rotation-limiting portion to define the fully closed position. In the embodiment shown in FIG. 14, behind hooked member 141 is provided shoulder 144 which defines a flat side surface. In the fully open position, shoulder 144 is adapted to abut wall portion 129 of first hinge member 121 to limit rotation of the temple arm.

Second hinge member 122 comprises a protrusion 145 that is adapted to co-operate with notches 127, 128 of first hinge member 121. Protrusion 145 is shaped and sized sympathetically to the shape and size of notches 127 and 128 for co-operation therewith. In the embodiment shown, protrusion 145 is positioned on the inner side of a tongue 146 positioned between the upper and lower hooked members at or near the end of tongue 146.

Operation of Hinge Members

To connect the first and second hinge members shown in the embodiments hereinbefore described, the upper and lower hooked members of the second hinge member are brought into engaging contact with the upwardly and downwardly extending portions of pivot shaft 123 respectively. The notches in the pivot shaft, for example notch 126, are positioned to receive a part of the end of the hooked members 141. To enable the hooked members to fully hook around pivot shaft 123, the first or second hinge member is deformed, for example by applying force to a middle section of the second hinge member in the direction of the first hinge member. The deformation means a portion of the second hinge member is forced to an orientation beyond a normal orientation when the hinge assembly is closed. This has the effect of changing the angle of hooked member 141 and straight section 143 relative to pivot shaft 123 and notch 126. This change in angle allows pivot shaft 123 to slide parallel to straight section 143 and fully co-operate with hooked member 141. The length of hooked member 141 and the position of notch 126 are determined to allow this form of engagement.

Varying Parameters

It will be understood that changes in various parameters permit easier or harder engagement/disengagement of the first and second hinge members, as may be required. For example, the extent of hooked member 141 affects the ease with which the hooked member can be engaged and disengaged with the pivot shaft.

Furthermore, the angle of straight section 143 with respect to the longitudinal axis of the second hinge member determines the angle at which the first hinge member can be connected to the second hinge member since to engage with hooked member 141, pivot shaft 143 must slide parallel to straight section 143. A greater angle of straight section 143 with respect to the longitudinal axis of the second hinge member means more deformation of the second hinge member is required to engage/disengage the hinge members, therefore making the connection more secure and harder to connect or disconnect.

Figure 15:
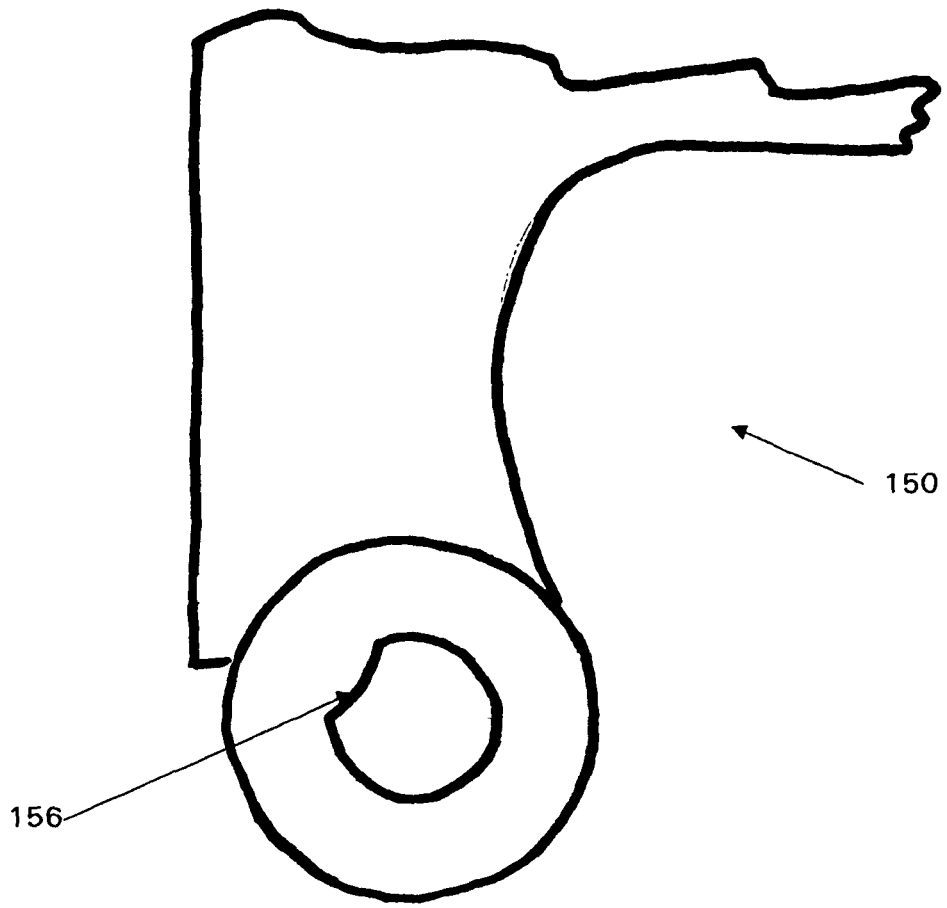
FIG. 15 is a plan view illustration of one end of a first hinge member according to another embodiment of the invention.

Similarly, the positioning of notch 126 on pivot shaft 123 also determines the degree of difficulty for connecting and disconnecting the hinge members. FIG. 15 is a plan view illustration of one end of a first hinge member 150 according to an embodiment of the invention. Notch 156 is positioned further towards a tip of first hinge member 150 when compared to the position of notch 126 on first hinge member 121 shown in FIG. 13 (FIG. 15 illustrates the other end of an eyeglass frame to that shown in FIG. 13, hence the components are reversed). That is, the angle between a line connecting the ends of notch 156 and a line parallel to a straight edge of first hinge member 150 is smaller than the equivalent angle for hinge member 121.

As described above, first hinge member 121 comprises two notches 127, 128 and second hinge member 141 comprises protrusion 145. These are sized and shaped correspondingly and co-operate to bias the first hinge member and second hinge member in positions such that the temple arm is biased to the fully open or closed positions. The positioning of notches 127, 128 and/or protrusion 145 may be varied depending on the desired fully open/closed position of the temple arm. It will also be understood that the size and shape of the notches determine the degree of bias, and the amount of force required to move the temple arms away from the fully open or closed positions, and can be varied as required.

In another embodiment, the first hinge member may comprise a protrusion and the second hinge member may comprise notches to bias the position of the temple arm as described. Those of skill in the art will appreciate that the invention encompasses variations in which components of the first and second hinge members are interchanged.

Upper and Lower Frame Parts

As discussed in relation to FIG. 11, in preferred embodiments the frame of the eyeglass assembly comprises upper and lower frame parts. Such an embodiment will now be described in more detail in relation to FIG. 16, which is an exploded perspective view illustration of a frame 160 according to one embodiment of the invention.

Frame 160 comprises upper frame part 161 and lower frame part 162, which are detachably connectable. For example, the frame parts are detachably connectable by means of male portions 163 co-operating with corresponding female portions 164. In other embodiments, other ways of detachably connecting the upper and lower frame parts are provided, such as will be apparent to those of skill in the art.

Figure 16:
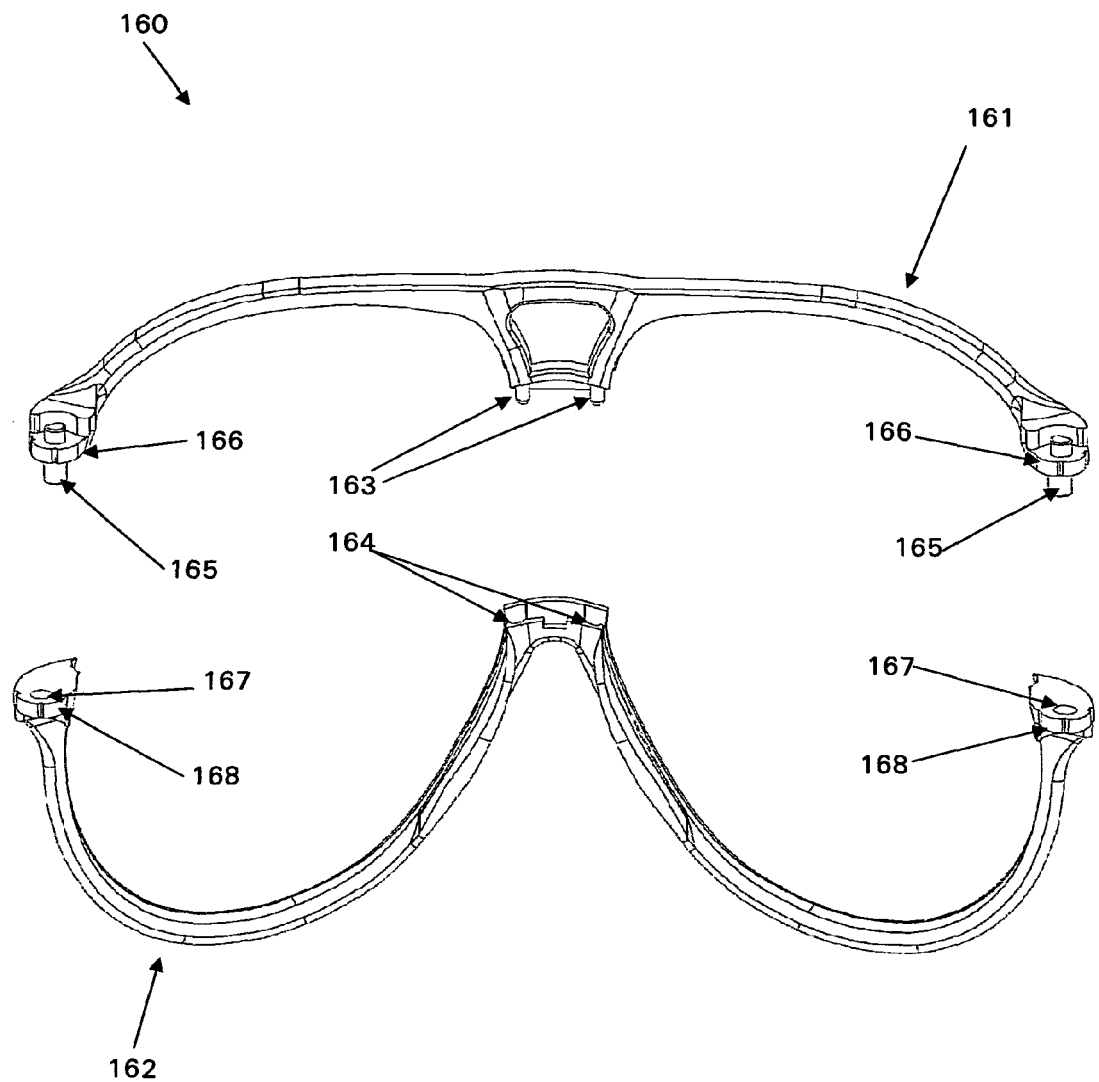
FIG. 16 is an exploded perspective view illustration of the eyeglass assembly shown in FIG. 11.

Frame 160 comprises pivot shaft 165 which, in the embodiment shown in FIG. 16, comprises upwardly and downwardly extending portions. Pivot shaft 165 is preferably of unitary construction with upper frame part 161. The upwardly and downwardly extending portions extend out of limb 166, with the downwardly extending portion of such length that, when positioned through a hole 167 in a limb 168 of lower frame part, it extends from limb 168 substantially the same amount as the upwardly extending portion extends from limb 166. When the upper and lower frame parts are connected, limbs 166 and 168 are positioned adjacently, with aligned edges.

It will be understood that embodiments in which the frame comprises upper and lower parts are not limited to the embodiment described above. In some embodiments, it is the lower frame part that comprises the pivot shaft, and upper frame part comprises a limb portion having a hole for receiving the pivot shaft. In still other embodiments, both upper and lower frame parts comprise parts of a pivot shaft.

Embodiments in which either the upper or lower frame part comprise the pivot shaft are generally preferred, because the friction fit of the pivot shaft through the hole in the limb of the frame part that receives the pivot shaft adds to secure the connection of the upper and lower frame parts.

Furthermore, the embodiment shown in FIG. 16, in which the upper frame part comprises the pivot shaft, is even more preferred because it is considered that, when used in the context of eyeglasses with interchangeable parts, the upper frame part will be changed more often. Therefore it is advantageous to have the lower frame part comprise those components that are least prone to wear. Since the male members and pivot shaft are vulnerable to becoming misshapen through use, and possibly snapping off, these are preferably comprised in the upper frame part.

Lenses

In the embodiments of the invention described above, the eyeglass assembly is adapted to receive two separate lenses. In an alternative embodiment, the eyeglass assembly may be adapted to receive a lens portion comprising a single lens assembly. For example, the lens assembly may take the form of a mono lens, which comprises a single transparent lens piece that spans the front width of the eyeglass assembly.

Figure 17:
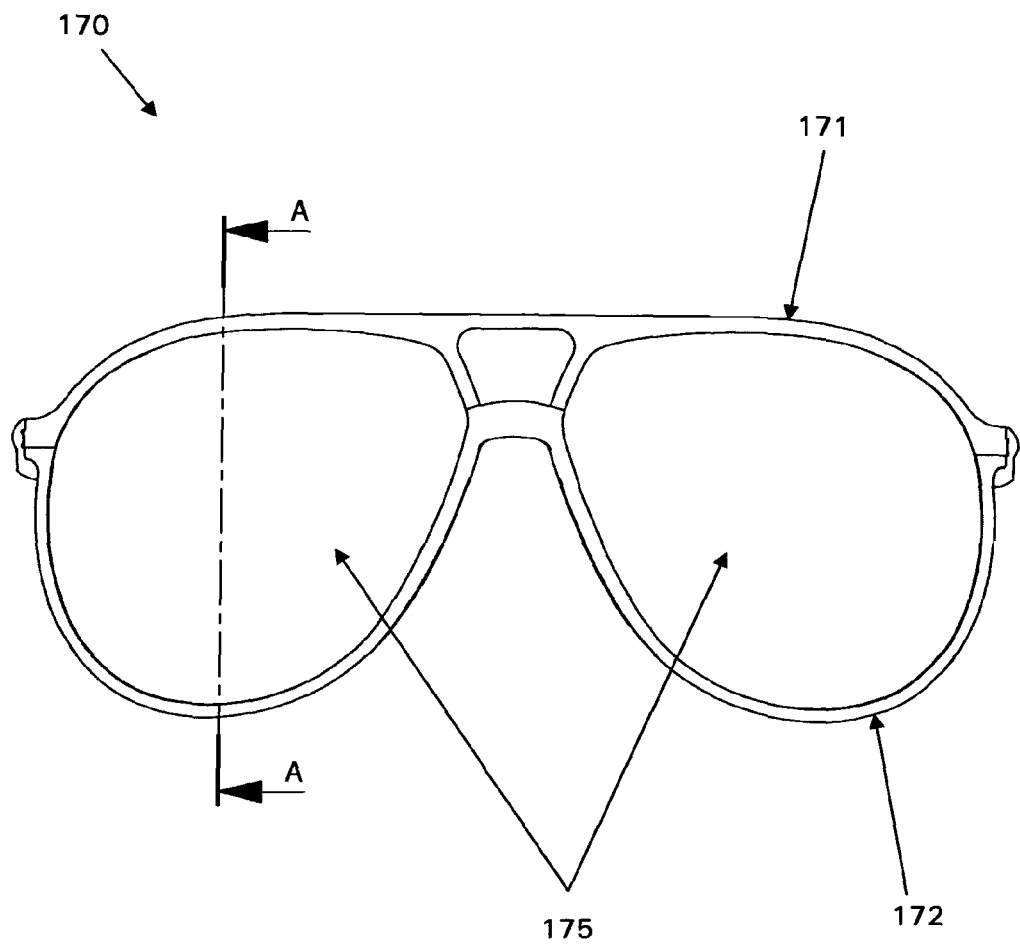
FIG. 17 is a front view illustration of an eyeglass assembly according to another embodiment of the invention.
Figure 18:
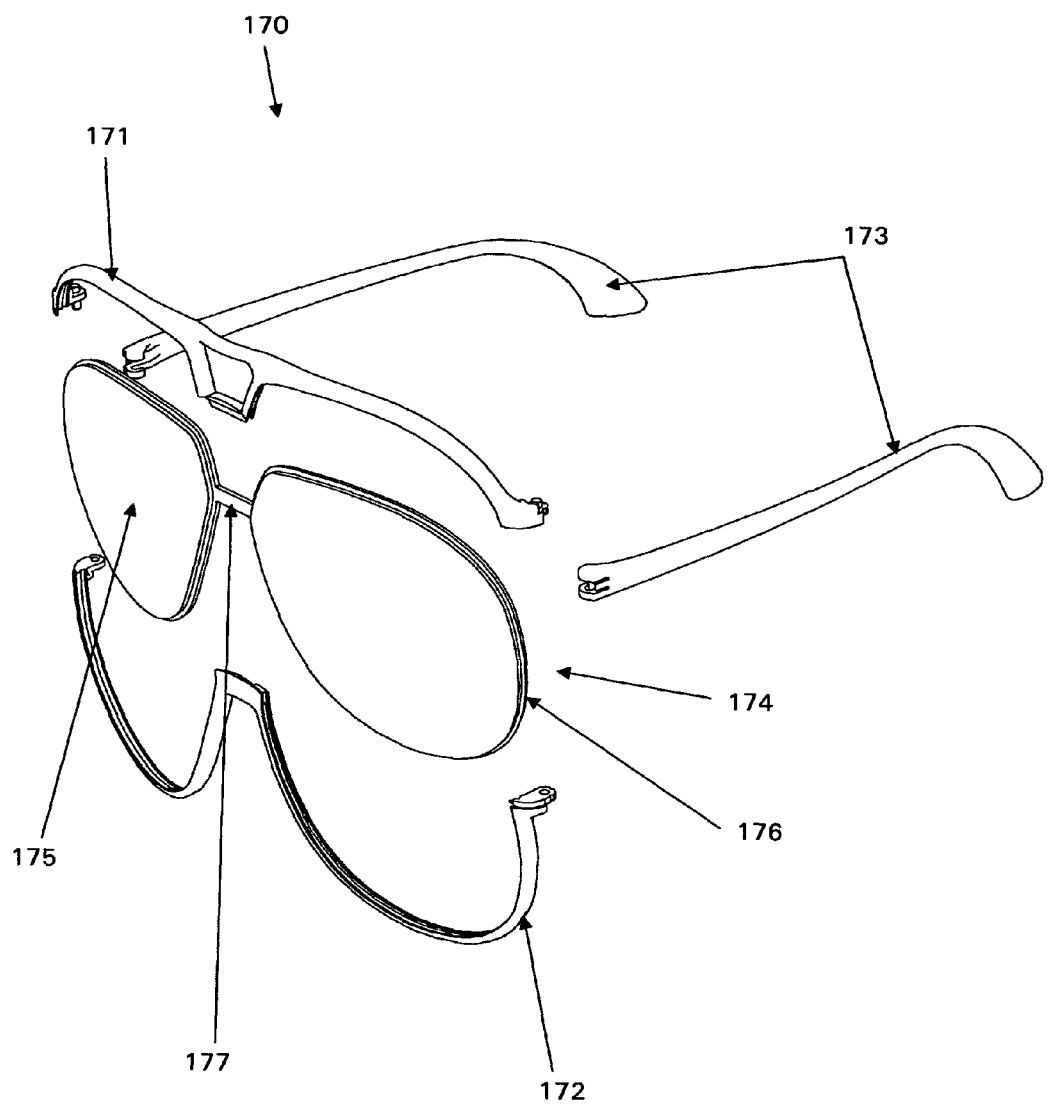
FIG. 18 is an exploded perspective view illustration of the eyeglass assembly shown in FIG. 17.
Figure 19:
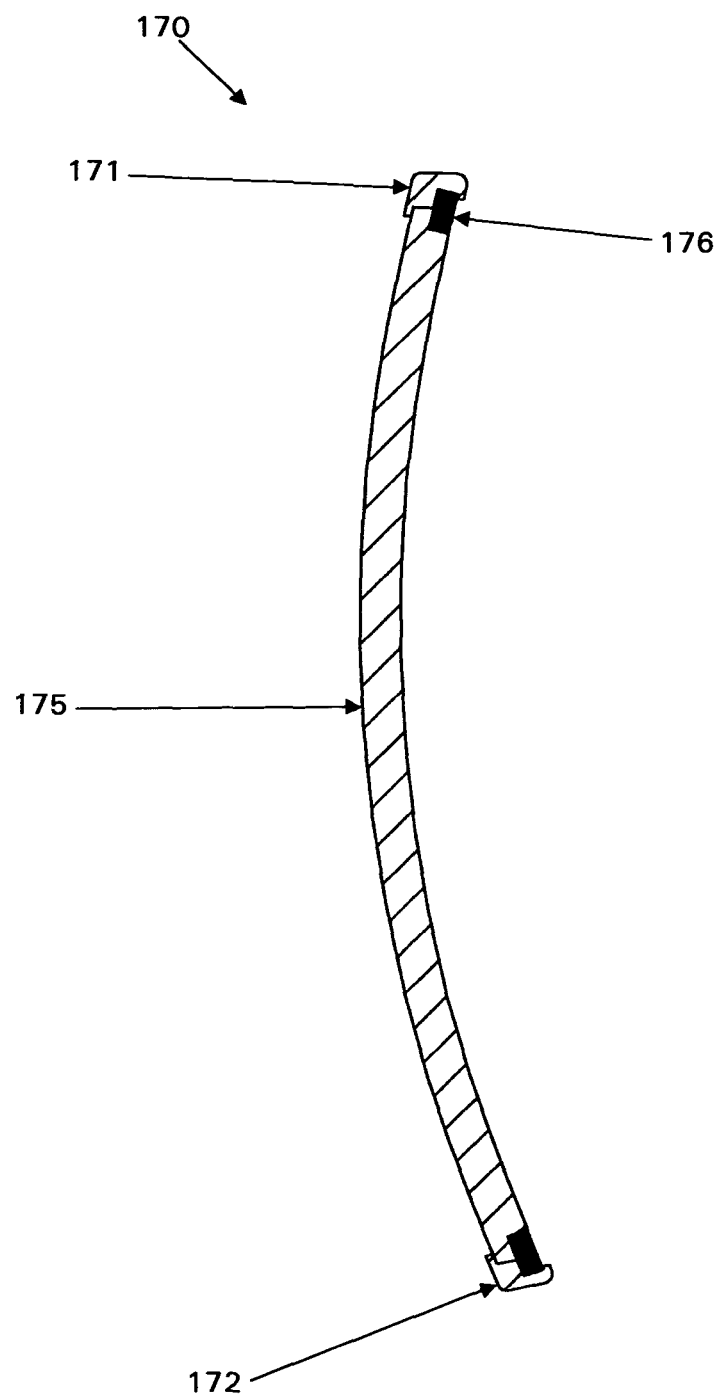
FIG. 19 is a cross-sectional view illustration of the eyeglass assembly shown in FIG. 17.

FIGS. 17 to 19 are illustrations of an eyeglass assembly 170 according to another embodiment of the invention. Eyeglass assembly 170 comprises upper and lower frame parts 171 and 172 respectively and temple arms 173 that are similar to those discussed in relation to other embodiments above.

Eyeglass assembly 170 further comprises lens assembly 174. Lens assembly 174 comprises one or more lenses 175 held within a sub-frame 176. Sub-frame 176 is preferably made from a thin, lightweight material such as stainless steel, which is able to receive lenses 175. Lenses 175 may press-fit within sub-frame 176. In another embodiment, a single mono lens may fit within the sub-frame.

In the embodiment shown in FIGS. 17 to 19, upper and lower frame parts 171 and 172 are adapted to receive sub-frame 176. It will be evident to those of skill in the art that the shape and structure of the upper and lower frame parts can vary depending on the type and shape of sub-frame to be used.

FIG. 19 is an illustration of cross-section A-A as marked in FIG. 17. As can be seen, lenses 175 have grooves for receiving sub-frame 176 such that sub-frame 176 is positioned toward the back of the upper and lower edges of lenses 175. Upper and lower frame parts 171 and 172 are shaped to receive the lenses and sub-frame having this structure. Advantageously, upper and lower frame parts 171 and 172 are positioned such that, when eyeglass assembly 170 is assembled, sub-frame 176 is not visible from the front of the eyeglass assembly. This may be desirable as a design preference. However, in other embodiments, sub-frame 176 may be made visible as required for a particular design.

When upper and lower frame parts 171 and 172 are connected together, they may assist in holding the one or more lenses 175 in place within sub-frame 176.

As can be seen in FIG. 18, lens assembly 174 comprises a bridge portion 177 connecting the two lenses 175. Bridge portion 177 may be integrally formed with either lenses 175 or sub-frame 176. Upper and lower frame parts 171 and 172 connect at the bridge are of the eyeglass assembly in such a way that bridge portion 177 is accommodated between the bridge connecting portions of the upper and lower frame parts. Again, it is to the discretion of a designer whether bridge portion 177 of the lens assembly is visible.

The use of a sub-frame as has been described may provide certain advantages. When frame parts are interchanged, the lenses may be retained in the sub-frame meaning there are less parts to take apart and put back together compared to eyeglasses with separate lenses. The sub-frame also increases the strength of the eyeglasses. Use of the sub-frame also gives greater scope for different design variations, increasing the versatility of the eyeglasses.

Injection Moulding Process

In preferred embodiments of the invention, the upper and lower frame parts and temple arms are injection moulded according to known techniques. The eyeglass components according to the invention preferably do not involve any undercuts, closed loops or slits that require the use of sliding cores or sliding wedges in the injection moulding process. In a preferred embodiment they are specifically designed such that sliding cores are not required in the injection moulding process.

This is enabled by the detachable design of the eyeglasses and, in particular, having detachable upper and lower frame parts. The join between the upper and lower frame part may be positioned such that, with the curvature of the lens rims, sliding cores are not required. As a result, the moulding of the components for eyeglasses according to the invention is relatively simple and has lower costs of design, tooling and production.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. An eyeglass assembly formed of detachable parts, the detachable parts comprising:
    at least one lens portion;
    an upper frame part;
    a lower frame part; and
    two temple arms adapted to pivotally attach to the upper frame part or the lower frame part to form two hinge assemblies,
    wherein, in each hinge assembly, one of the upper frame part and the lower frame part comprises a pivot shaft and the other of the upper frame part and the lower frame part comprises a pivot shaft receiving portion adapted to receive the respective pivot shaft,
    wherein the pivot shaft comprises an upwardly projecting portion and a downwardly projecting portion, one of the upwardly projecting portion and downwardly projecting portion being received by the pivot shaft receiving portion and extending beyond the pivot shaft receiving portion, and
    wherein each temple arm is adapted to pivotally attach to at least the portion of the pivot shafts of the respective hinge assembly extending beyond the pivot shaft receiving portion.

2. An eyeglass assembly as claimed in claim 1, wherein the upper frame part and lower frame part together define at least one aperture for receiving the at least one lens portion, wherein the at least one aperture substantially entirely surround(s) the at least one lens received in the aperture(s).

3. An eyeglass assembly as claimed in claim 2, wherein only when the upper frame part and the lower frame part are attached together do they define the at least one aperture.

4. An eyeglass assembly as claimed in claim 1, wherein the detachable upper and lower frame parts may be interchanged such that the eyeglass assembly selectively comprises at least one lens portion of different shapes and/or sizes.

5. An eyeglass assembly as claimed in claim 1, wherein the at least one lens portion comprises two lenses.

6. An eyeglass assembly as claimed in claim 1, wherein the at least one lens portion comprises a lens assembly.

7. An eyeglass assembly as claimed in claim 6, wherein the lens assembly comprises one or more lenses within a sub-frame.

8. An eyeglass assembly as claimed in claim 1, each temple arm comprises at least one hooked member adapted to allow rotation of the respective temple arm around the respective pivot shaft.

9. An eyeglass assembly as claimed in claim 1, wherein the upwardly projecting portion and the downwardly projecting portion of the pivot shaft are of unitary construction.

10. An eyeglass assembly as claimed in claim 1, wherein the upper frame part comprises the pivot shaft and the lower frame part comprises a pivot shaft receiving portion adapted to receive the downwardly projecting portion of the pivot shaft such that the pivot shaft extends downwards from the pivot shaft receiving portion.

11. An eyeglass assembly as claimed in claim 1, wherein each temple arm comprises upper and lower hooked members adapted to co-operate with the upwardly projecting portion and downwardly projecting portion of the pivot shaft respectively.

12. An eyeglass assembly as claimed in claim 1, wherein the eyeglass assembly comprises biasing means to bias the temple arms to at least one position in relation to the upper frame part and/or lower frame part.

13. An eyeglass assembly as claimed in claim 1, wherein the upper frame part and the lower frame part are detachably attached at a centre portion thereof.

14. An eyeglass assembly as claimed in claim 1, wherein the eyeglass assembly comprises one or more nose resting portions adapted to rest on a nose of a wearer.

15. An upper frame part adapted for use in an eyeglass assembly according to claim 1 and configured to detachably attach to a lower frame part comprising two pivot shaft receiving portions, wherein the upper frame part comprises two pivot shafts, each pivot shaft being adapted to be received by one of the pivot shaft receiving portions of the lower frame part to couple the upper frame part with the lower frame part, and each pivot shaft being adapted to be pivotally attached to a temple arm.

16. A lower frame part adapted for use in an eyeglass assembly according to claim 1 and configured to detachably attach to an upper frame part comprising two pivot shafts, wherein the lower frame part comprises two pivot shaft receiving portions, each pivot shaft receiving portion being adapted to receive one of the pivot shafts of the upper frame part to couple the lower frame part with the upper frame part.

17. A kit of parts for constructing an eyeglass assembly as claimed in claim 1.

18. A method of manufacturing an eyeglass assembly comprising the steps of:
  injection moulding, without the use of sliding cores, detachable parts comprising:
    an upper frame part; and
    a lower frame part;
  providing two temple arms adapted to pivotally attach to the upper frame part or the lower frame part to form two hinge assemblies;
  providing at least one lens portion; and
  assembling the detachable parts and at least one lens portion together to form the eyeglass assembly,
  wherein, in each hinge assembly, one of the upper frame part and the lower frame part comprises a pivot shaft and the other of the upper frame part and the lower frame part comprises a pivot shaft receiving portion adapted to receive the respective pivot shaft,
  wherein the pivot shaft comprises an upwardly projecting portion and a downwardly projecting portion, one of the upwardly projecting portion and downwardly projecting portion being received by the pivot shaft receiving portion and extending beyond the pivot shaft receiving portion, and
  wherein each temple arm is adapted to pivotally attach to at least the pivot shaft of the respective hinge assembly extending beyond the pivot shaft receiving portion.

19. An eyeglass assembly as claimed in claim 1, wherein constituent parts of the assembly are adapted to be attached without a separate tool.

20. A method of manufacturing an eyeglass assembly as claimed in claim 18, wherein constituent parts of the assembly are adapted to be attached without a separate tool.

* * * * *